(12) United States Patent  
Carnevali

(10) Patent No.: US 7,495,895 B2  
(45) Date of Patent: Feb. 24, 2009

(54) PROTECTIVE COVER FOR DEVICE HAVING TOUCH SCREEN

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 277 days.

(21) Appl. No.: 11/406,755

(22) Filed: Apr. 19, 2006

(65) Prior Publication Data

US 2007/0247793 A1 Oct. 25, 2007

(51) Int. Cl.
*G06F 1/16* (2006.01)

(52) U.S. Cl. .................. 361/681; 455/90.3; 455/575.8

(58) Field of Classification Search .............. 361/681; 455/90.3, 575.8
See application file for complete search history.

(56) References Cited

U.S. PATENT DOCUMENTS

| | | | |
|---|---|---|---|
| 5,096,317 A | | 3/1992 | Phillippe |
| 5,272,771 A | | 12/1993 | Ansel et al. |
| 5,583,742 A | * | 12/1996 | Noda et al. ................. 361/681 |
| 5,584,054 A | | 12/1996 | Tyneski et al. |
| 5,586,002 A | * | 12/1996 | Notarianni .................. 361/681 |
| 5,646,649 A | | 7/1997 | Iwata et al. |
| 5,931,297 A | * | 8/1999 | Weill et al. ..................... 383/89 |
| 5,940,153 A | * | 8/1999 | Castaneda et al. ........... 361/681 |
| 5,944,432 A | * | 8/1999 | Richardson .............. 312/208.3 |
| 5,990,874 A | | 11/1999 | Tsumura et al. |
| 6,034,866 A | * | 3/2000 | Nobuchi et al. ............. 361/681 |
| 6,273,252 B1 | * | 8/2001 | Mitchell ..................... 206/320 |
| 6,295,198 B1 | | 9/2001 | Loh et al. |
| 6,406,758 B1 | | 6/2002 | Bottari et al. |
| 6,536,589 B2 | * | 3/2003 | Chang ......................... 206/320 |
| 6,646,864 B2 | | 11/2003 | Richardson |
| 6,659,274 B2 | * | 12/2003 | Enners ........................ 206/305 |
| D485,438 S | * | 1/2004 | Domotor ..................... D3/319 |
| 6,701,159 B1 | * | 3/2004 | Powell ..................... 455/575.8 |
| 6,731,913 B2 | * | 5/2004 | Humphreys et al. ......... 455/90.3 |
| 6,772,881 B2 | * | 8/2004 | Le et al. ...................... 383/106 |
| 6,842,171 B2 | * | 1/2005 | Richter et al. ............... 345/173 |
| 6,887,002 B1 | * | 5/2005 | Chen .......................... 206/230 |
| 6,914,774 B1 | * | 7/2005 | Albertini et al. ............ 361/683 |
| 6,984,680 B2 | | 1/2006 | Quinn |
| 6,995,976 B2 | | 2/2006 | Richardson |
| 7,031,148 B1 | * | 4/2006 | Lin .............................. 361/681 |
| 7,054,441 B2 | * | 5/2006 | Pletikosa .................... 361/681 |
| 7,248,904 B2 | * | 7/2007 | Gartrell et al. ........... 455/575.8 |
| 2002/0027768 A1 | * | 3/2002 | Tseng et al. ................. 361/683 |
| 2002/0086702 A1 | * | 7/2002 | Lai et al. ..................... 455/556 |
| 2002/0101411 A1 | * | 8/2002 | Chang ......................... 345/179 |
| 2003/0160754 A1 | * | 8/2003 | Hanson et al. .............. 345/156 |
| 2005/0139498 A1 | * | 6/2005 | Goros ......................... 206/320 |
| 2006/0226040 A1 | * | 10/2006 | Medina ....................... 361/683 |

* cited by examiner

*Primary Examiner*—Anatoly Vortman
*Assistant Examiner*—Adrian S Wilson
(74) *Attorney, Agent, or Firm*—Charles J. Rupnick, Attorney at Law

(57) ABSTRACT

A protective cover for a device having a touch-sensitive screen, the cover being a substantially optically transparent flexible protective cover formed of a unitary combination of a mask portion substantially surrounded with a plurality of integrally interconnected curtain portions extending therefrom and forming therebetween a plurality of interconnected lip portions, the mask, curtain and lip portions forming a cavity therebetween with the lip portions surrounding a mouth opening thereinto; and the mask portion further having a relatively thicker frame portion surrounding a relatively thinner recessed integral window portion formed of a flexible membrane that is positioned over the device's touch screen.

19 Claims, 7 Drawing Sheets

PROTECTIVE COVER FOR DEVICE HAVING TOUCH SCREEN

FIELD OF THE INVENTION

The present invention relates to a protective cover for a portable apparatus having means for inputting data through a touch panel, and particularly to a protective cover that permits inputting data while engaged with the touch panel.

BACKGROUND OF THE INVENTION

Portable computer devices having a pressure or "touch" sensitive screen are well-known wherein a stylus is applied to the touch screen for inputting data and operating the computer device in general, as explained by Loh, et al. in U.S. Pat. No. 6,295,198, "Computer device," which is incorporated herein by reference for all it discloses and teaches. A Personal Digital Assistant (PDA) is one example of such a computer device having a touch sensitive screen. Present generation cellular telephones are another example. Other examples include a pocket personal computer (pocket PC), a mobile presentation system (MPS) player, and a MP3 player. Yet other examples are also well-known.

Touch sensitive screens are known to include a glass substrate with a resistive coating on surface thereof, an edge electrode pattern, and a wiring harness connected to control circuitry that detects where on the screen surface a touch occurs by a user's finger or a stylus. U.S. Pat. Nos. 4,198,539; 4,293,734; 4,371,746 and 6,406,758 are incorporated herein by this reference as background information regarding touch screen technology.

FIG. 1 illustrates by example and without limitation one portable computer device 1 commonly referred to as a "notebook" or "notepad" and embodying touch screen technology as well as traditional switch keys. For example, the device 1 includes a generally rectangular housing or casing 2 with a pressure- or touch-sensitive display screen 3 provided on a top or operating surface 4. The casing 2 may include a key pad 5 having one or more traditional switch keys 6 which are connected to an electronic circuit (not shown). Different front, rear and side surfaces 7, 8 and 9 of the casing 2 may include one or more control surfaces, for example a power ON-OFF key 10, as well as a battery charger jack 11, and/or a audio head-phone output jack 12. Portable computer devices 1 are also known to include a hard wire interface jacks 13, such as a serial or parallel input/output (I/O) port or more modern USB I/O port. Indicators 14 such as one or more light emitting diode (LED) may be provided on the operating surface 4 for indicating the status of particular operations of the device 1. Additionally, a slot 15 or other storage chamber may be provided for holding a stylus 16 of the type typically used for operating the touch screen 3. One or more corners 17 and upper and lower edges 18, 19 of the casing 2 may be rounded for aesthetic appeal and comfort of the user.

FIG. 2 illustrates by example and without limitation another portable computer device 20 also commonly referred to as a "notebook" or "notepad" and also embodying touch screen technology as well as traditional switch keys. For example, the device 20 includes another generally rectangular housing or casing 22 with another pressure- or touch-sensitive display screen 23 provided on a top or operating surface 24. The casing 2 may include a keyboard 25 having a traditional array of switch keys 26 which are connected to an electronic circuit (not shown). Different front, rear and side surfaces 27, 28 and 29 of the casing 22 may include one or more control surfaces, for example the power ON-OFF key 10, as well as the battery charger jack 11, and/or the audio head-phone output jack 12. The portable computer device 20 may also include a CD or DVD drawer-type disc drive 31 for inputting pre-formatted data, or saving large amounts of data. One or more of the hard wire interface jacks 13, such as a serial or parallel input/output (I/O) port or more modern USB I/O port, may also be provided. The indicators 14 such as one or more light emitting diode (LED) may be provided on the operating surface 24 for indicating the status of particular operations of the device 20. Additionally, many such portable computer devices 20 include a mechanism for manipulating the cursor, commonly referred to a "cursor control" which is provided by example and without limitation as a toggle switch 33 frequently positioned above the center of the keyboard 25 below the touch screen 23, or alternatively as a pressure- or touch-sensitive "touch" pad 35 often positioned to one side of the keyboard 25.

The device 20 may also have a built-in microphone or speaker may be emplaced behind a grille 36 in, for example, the front surface 7 of the casing 22. The slot 15 or other storage mechanism may be provided for holding the stylus 16 of the type typically used for operating the touch screen 23. Also, one or more corners 37 and upper and lower edges 38, 39 of the casing 22 may be rounded for aesthetic appeal and comfort of the user.

As disclosed by Tsumura, et al. in U.S. Pat. No. 5,990,874, "Protective cover for a portable apparatus touch panel," which is incorporated in it entirety herein by reference, touch sensitive screens are now widely used in portable computer devices for simplifying complicated functional operations and data input. However, as also disclosed by Tsumura, et al., a problem with such touch sensitive screens is that, although the touch sensitive screens is conveniently easy to input data, it is easily influenced by external pressure, electrostatic noise, etcetera, when the device is carried because the touch screen has such a structure that its display screen is directly touched with a pen. It is therefore necessary to provide protection for the touch sensitive screen.

Generally, three types of protection are provided for the touch sensitive screen: a lid or cover that overlays the touch screen, a coating applied directly to the touch screen, and a protective box that includes a flexible membrane that permits application of the stylus to the touch screen for inputting data and operating the computer device in general.

Loh, et al. in U.S. Pat. No. 6,295,198, which is incorporated herein by reference, discloses one touch screen device having a movable protective cover. As taught by Loh, et al., the computer device has a casing which accommodates an electronic circuit and a touch screen. A protective cover is movably arranged on the casing for selectively covering and uncovering at least the touch screen. The protective cover of Loh, et al. includes a compartment in which the stylus is removably stored.

Iwata, et al. in U.S. Pat. No. 5,646,649, "Portable information terminal," which is incorporated in its entirety herein by reference, discloses another touch screen device having a movable touch screen device having a movable protective cover. As taught by Iwata, et al., the portable device includes an opening and closing protective cover over the surface of the pressure-sensitive touch screen. An operating button is provided in the cover against the surface of the touch screen in specific areas that correspond to major function entry or data entry points on the touch screen that permit the user to enter major functions or data into the device while the lid is closed to protect the pressure-sensitive touch screen. The protective cover is opened to enter other functions or data not available through the operating buttons.

Tyneski, et al. in U.S. Pat. No. 5,584,054, "Communication device having a movable front cover for exposing a touch sensitive display," which is incorporated in its entirety herein by reference, discloses another portable device having a pressure-sensitive touch screen which a moveable hinged cover. In a closed position the cover has a quantity of pressure surfaces located on an inner surface adjacent to the touch screen, with each of the pressure surfaces positioned corresponding to respective activation area of the touch screen. A quantity of keys are positioned on an outer surface of the cover corresponding to the pressure surfaces on the inner surface of the cover. When the cover is closed to protect the pressure-sensitive touch screen, data may be input to the device by applying pressure to the keys on the outer surface of the cover, which in turn applies pressure to the corresponding activation areas of the touch screen for transferring specific data to the device.

Tsumura, et al. in U.S. Pat. No. 5,990,874, "Protective cover for a portable apparatus touch panel," which is incorporated herein by reference, discloses a portable device having a transparent and flexible protective lid which openably and closably covers a touch pad which also serves as a display screen. The lid has a U-shaped slit portion formed therein and has a protrusion on a surface of the U-shaped slit portion facing the touch panel. When the protective lid is closed, the slit portion may be pushed down to actuate the touch panel in the activation area corresponding to the protrusion on the surface of the slit portion. When the protective lid is open, the touch panel may be directly actuated using the stylus.

Bottari, et al. in U.S. Pat. No. 6,406,758, "Method of applying a protective coating to a touch screen panel," which is incorporated in its entirety herein by reference, discloses a method of applying a protective coating to a touch screen panel used in a portable computer device. As taught by Bottari, et al., a coating material which cures at an elevated temperature is applied to at least one surface of a touch screen panel. The panel is then heated to a temperature to fully cure the coating material.

Richter, et al. in U.S. Pat. No. 6,842,171, "Touch panel having edge electrodes extending through a protective coating," which is incorporated in its entirety herein by reference, discloses another method of manufacturing a touch screen panel, including applying a resistive coating to one surface of an insulative substrate, applying an insulative protective coating to the resistive coating, depositing a conductive edge electrode pattern including a plurality of edge electrodes on the protective coating, and firing the panel until the edge electrodes etch through the protective coating and make electrical contact with the resistive coating.

Richardson in U.S. Pat. Nos. 6,646,864 and 6,995,976, both "Protective case for touch screen device," which is incorporated in its entirety herein by reference, discloses a protective case for an electronic device that has a pressure-sensitive touch screen. The device is enclosed in the protective case with the touch screen adjacent to a window in the cover of the case. A membrane is fitted into the window adjacent to the touch screen, which protects the touch screen. The membrane is a thin flexibly resilient and optically transparent plastic material that is adapted to the specific contour and profile of the electronic device and allows the user to apply pressure to the touch screen using the stylus through the membrane.

SUMMARY OF THE INVENTION

The present invention is a unitary optically transparent elastomeric cover for partially covering a device having a touch-sensitive screen. Generally, three types of protection are known for the touch sensitive screen. However, these known solutions may be unsatisfactory for applications that require access to the pressure-sensitive touch screen unimpeded by covers that need to be lifted to gain use of the entire touch screen area and yet provide protection to sensitive portions of the device other than the touch screen.

Therefore, according to one aspect of the invention, the present invention overcomes limitations of the prior art by providing a protective cover for a device having a touch-sensitive screen, the cover being a substantially optically transparent flexible protective cover formed of a unitary combination of a mask portion substantially surrounded with a plurality of integrally interconnected curtain portions extending therefrom and forming therebetween a plurality of interconnected lip portions, the mask, curtain and lip portions forming a cavity therebetween with the lip portions surrounding a mouth opening thereinto; and the mask portion further having a relatively thicker frame portion surrounding a relatively thinner recessed integral window portion formed of a flexible membrane that is positioned over the device's touch screen.

According to another aspect of the present invention, the mask, curtain and lip portions with the curtain portions are contiguous with the mask portion, and different curtain portions are contiguous corresponding ones of the lip portions.

According to another aspect of the present invention, the mask portion includes access to a one or more switch keys on the face of the device, the access being either an open port or another flexible membrane that is positioned over the device's switch keys.

According to another aspect of the present invention, the cover also includes access to one or more control surfaces on any of the front, rear and side surfaces of the device's casing, such as a battery charger jack hard, an audio head-phone output jack, a hardwire interface jack and/or a slot or other storage mechanism in the casing for holding a stylus for operating the device's touch screen.

According to another aspect of the present invention, a method of using the invention is provided.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
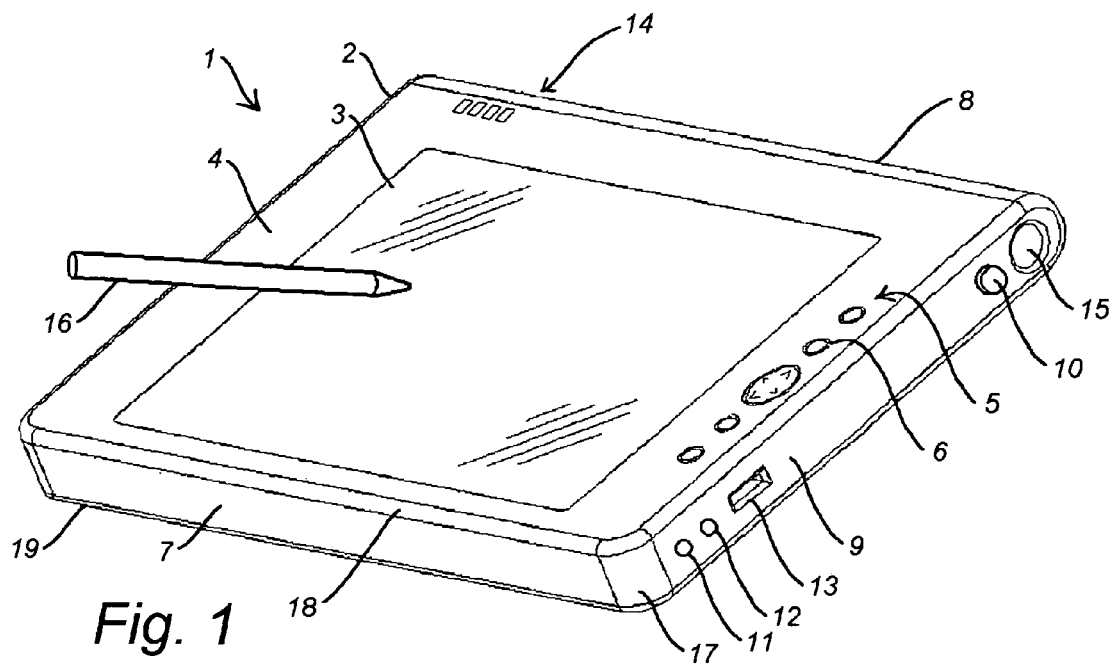
FIGS. 1 and 2 are perspective views that illustrate by example and without limitation different portable computer devices of the prior art each having a pressure or "touch" sensitive screen.
Figure 3:
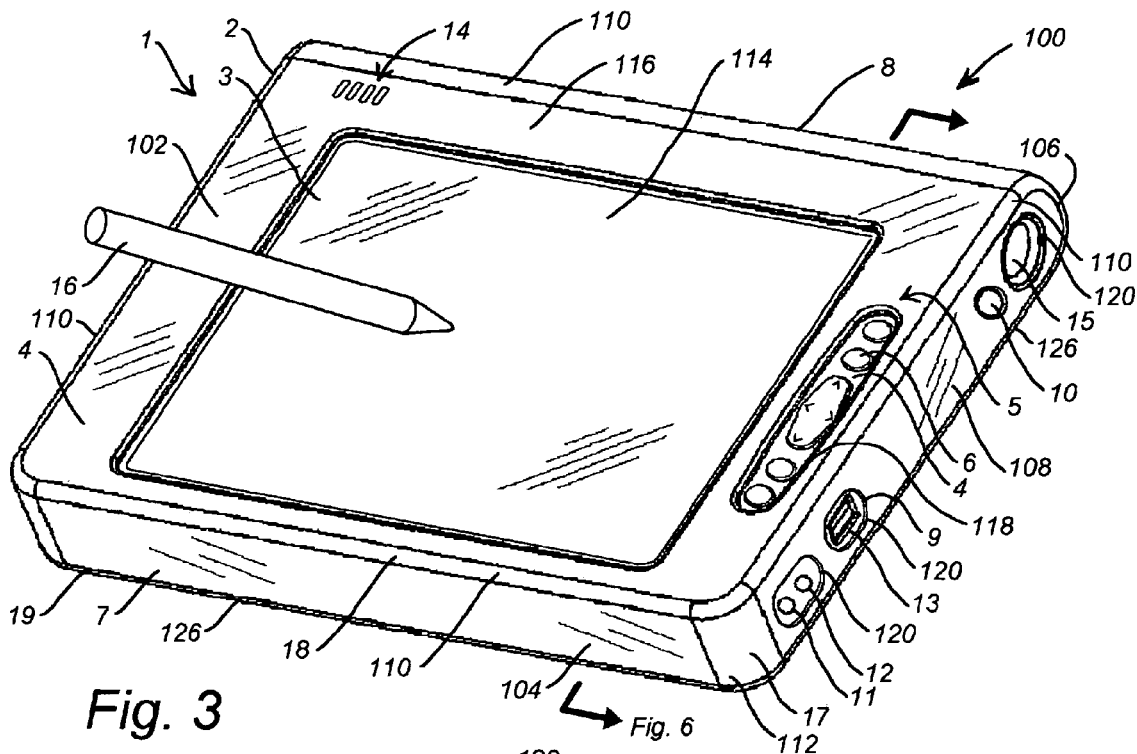
FIG. 3 is a top perspective view that illustrates the integral one-piece optically transparent elastomeric protective cover of the present invention in situ as partially enveloping a portable computer device of the prior art having a pressure or "touch" sensitive screen generally of the type illustrated in FIG. 1.

FIG. 3 illustrates the completely integral one-piece optically transparent elastomeric protective cover 100 of the present invention in situ as partially enveloping the portable computer device 1 generally of the type illustrated in FIG. 1 or another portable electronic device of the prior art having the pressure-sensitive "touch" screen 3. The cover 100 of the present invention is a sheath molded of a suitable optically transparent flexibly resilient elastomer, such as vinyl, in a size and shape to fit over and closely conform to the portable computer device 1 so that the cover 100 fits the device 1 like a surgical glove. Optionally, the optically transparent elastomer of the cover 100 is clear, or may be tinted with color, such as pink or blue as may be aesthetically pleasing. Optionally, the optically transparent elastomer of the cover 100 is a dielectric material having static dissipative properties, such as an effective dielectric constant on the order of about 4.5. For example, the elastomer includes a quantity of powdered metal, mixed-metal oxides, polymers, or is coated with a static dissipative coating. Optionally, the optically transparent elastomer of the cover 100 is polarized to reduce glare.

A mask portion 102 of the elastomeric material covers device's pressure-sensitive touch screen 3 to protect it from scratching, denting, and other external abrasions. Furthermore, a known hypoallergenic additive is optionally provided as a constituent of the elastomeric material composition, whereby the protective cover 100 is more generally useful. Additionally, the cover 100 protects the device 1 from spills of liquid by covering substantially all of the top or operating surface 4 of the device's casing 2. Integral front, rear and side curtain portions 104, 106 and 108 of the elastomeric cover 100 extend from the mask portion 102 through seamless upper edge portions 110 to fit over the device's upper edges 18 and extend down across the respective front, rear and side surfaces 7, 8 and 9 of the casing 2. Integral corner portions 112 may be molded seamlessly between the different front, rear and side curtains 104, 106, 108 to contour the elastomeric cover 100 to the device casing 2 so that it fits closely about the casing's corners 17, which further protects the device 1 from spills of liquid that might otherwise drain over the casing 2. The protective cover 100 is thus contoured to closely conform to the device casing 2.

The optically transparent elastomeric material of the cover 100 permits viewing of the display screen 3 while emplaced, as well as viewing of any indicator lights 14 that may be present on the device's operating surface 4 or side surfaces 7, 8, 9. Furthermore, the flexibility of the elastomeric material permits application of the stylus 16 to the touch screen 3 for inputting data and operating the computer device 1 in general. Furthermore, the cover 100 optionally includes a relatively thinner window area 114 within a relatively thicker frame portion 116 of the mask 102. The window area 114 is structured as a thin flexible membrane in a position that corresponds to the device's pressure-sensitive touch screen 3 and which permits application therethrough to the touch screen of pressure exerted by the stylus 16 for inputting data and operating the computer device in general. While the frame portion 116 of the mask 102 may be relatively thick, by example and without limitation about ⅛ inch or so, the window area 114 is substantially thinner, by example and without limitation about 0.05 to 0.06 inch thick. Furthermore, the thin flexible membrane of the window area 114 is offset from the exterior surface of the frame portion 116 and flush with its interior surface so that the flexible membrane is in direct contact with the device's pressure-sensitive touch screen 3. The window area 114 thereby provides a thin and flexible membrane over the device's pressure-sensitive touch screen 3. The frame portion 116 of the mask 102, in contrast to the window area 114, operates as a stiffener that shapes and stabilizes the window portion 114 and resists slipping, stretching, waving folding of the thinner flexible membrane. One or more access ports 118 are optionally provided in the elastomeric material of the frame portion 116 of the mask portion 102 in a position that corresponds to the device's key pad 5, if present, on the device's top or operating surface 4. The access ports 118, if present, provide user access directly to the switch keys 6 of the key pad 5. By example and without limitation, the access port 118, if present, may be an opening formed through the thicker elastomeric material of the frame portion 116 of the mask portion 102. Alternatively, the access portion 118 of the frame 116 is another window area structured as a relatively thin flexible membrane portion of the frame 116, similar to the window area 114, whereby the switch keys 6 are easily manipulated through the relatively thin flexible membrane, while the membrane effectively protects the device 1 from spills of liquid by covering the key pad 5. Optionally, when the access portion 118 is provided as another window area, the relatively thin flexible membrane is offset from the interior surface of the frame 116 so that the flexible membrane leaves sufficient space for the device's key pad 5 without exerting its own pressure on the switch keys 6. According to another option, the access portion 118 is eliminated, and the switch keys 6 of the key pad 5 are manipulated through the relatively thicker material of the mask's frame portion 116 which also effectively protects the device 1 from spills of liquid.

The front, rear and side curtains 104, 106, 108 and upper edge portions 110 of the cover 100 also may be relatively thick, by example and without limitation about 1/8 inch or so, like the frame portion 116 of the mask 102. Furthermore, one or more of the front, rear and side curtains 104, 106, 108 may include an appropriate quantity of aperture-type access ports 120 in different positions that correspond to the device's control surfaces and which permit appropriate access. By example and without limitation, one of the access ports 120 may be positioned to correspond to one of the hard wire interface jacks 13; while another of the access ports 120 may be positioned to correspond to the battery charger jack 11 and the audio head-phone output jack 12, and may be sized to permit access to both. Still another of the access ports 120 may be positioned to correspond to the slot 15 or other storage mechanism in the casing 2 for holding the stylus 16.

Figure 4:
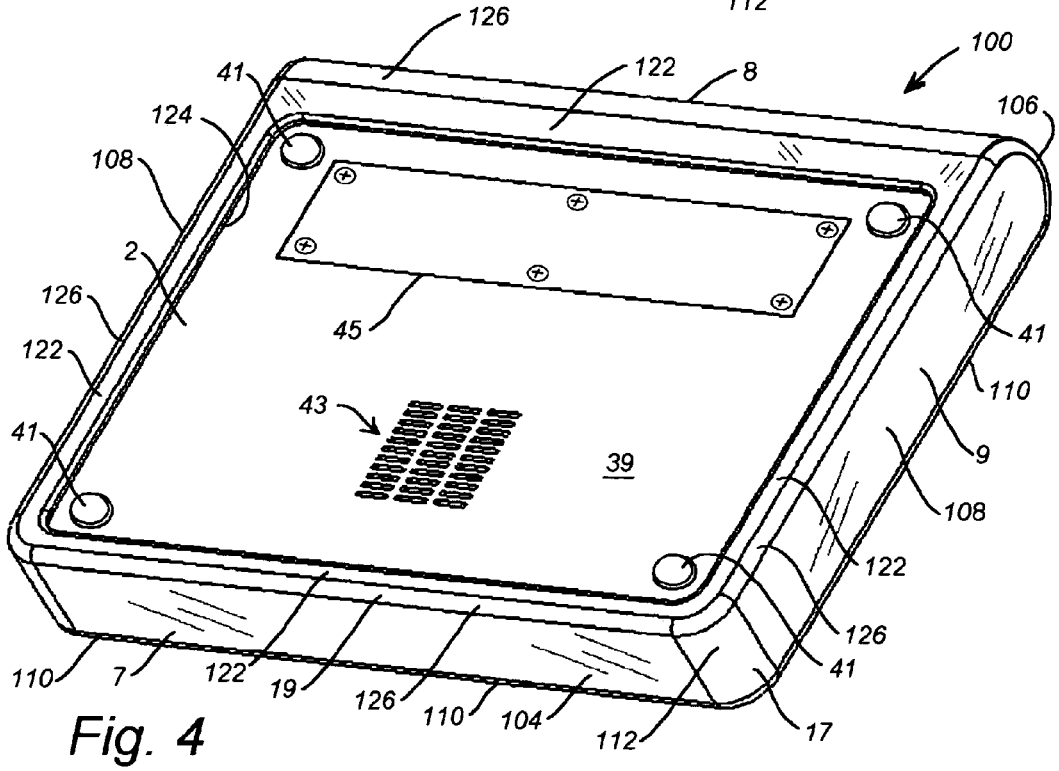
FIG. 4 is a bottom perspective view that illustrates the integral one-piece optically transparent elastomeric protective cover of the present invention in situ as partially enveloping a portable computer device of the prior art having a pressure or "touch" sensitive screen generally of the type illustrated in FIG. 1.

FIG. 4 shows a bottom surface 39 of the device casing 2 opposite from the top or operating surface 4 with its touch screen 3, and illustrates the elastomeric protective cover 100 of the present invention in situ as partially enveloping the portable computer device 1. As illustrated by example and without limitation, the protective cover 100 includes integral lips 122 of the elastomeric cover material that form a mouth opening 124 for receiving the device 1. The lips 122 extend only a short distance across the backside 39 of the portable computer device casing 2. By example and without limitation, lower edge portions 126 seamlessly join the integral lips 122 to each of the different front, rear and side curtain portions 104, 106, 108 of the elastomeric cover 100 and the integral corner portions 112 therebetween. The lower edge portions 126 wrap around the casing's lower edges 19 and the integral lips 122 extend onto the casing's bottom surface 39, which further protects the device 1 from spills of liquid that might otherwise drain over the casing 2. The flexible elastomeric material allows the lips 122 to be stretched slightly for spreading the mouth opening 124 in the protective cover 100 to receive the device casing 2 therethrough. The mouth opening 124 is optionally sized to be sufficiently large to expose selected portions of the device 1 therethrough. For example, the mouth opening 124 is large enough to expose feet 41 which are often provided on the device's bottom surface 39. Furthermore, the large size of the mouth opening 124 permits exposure of critical casing features 43, such as cooling vents, and also provides easy accessibility to other casing features 45, such as different device access panels.

After cover 100 is fit over the device casing 2, the resiliency of the elastomeric material cause the slightly stretched mouth opening 124 to reform over the backside 39 of the device casing 2. The resiliency of the elastomeric material also contours the remainder of the protective cover 100 to closely conform to the mask portion 102 to the operating surface 4 of the device's casing 2 with the window portion 114 closely conformed to the touch screen 3, while the different front, rear and side curtain portions 104, 106, 108 closely conform to respective front, rear and side casing surfaces 7, 8 and 9. Thereafter, the device 1 is protected from bumps and scrapes and from virtually all spills of liquid draining over the device casing 2.

When the cover 100 is to be removed, the mouth opening 124 can be enlarged by peeling back the lips 122 from the device casing 2, and the device 1 is removed from cover 100 through the enlarged mouth opening 124 by peeling away the remaining mask portion 102 and curtain portions 104, 106, 108 from the device casing 2. The protective cover 100 is either cleaned and reapplied at a later date, or replaced with a new cover 100.

Figure 2:
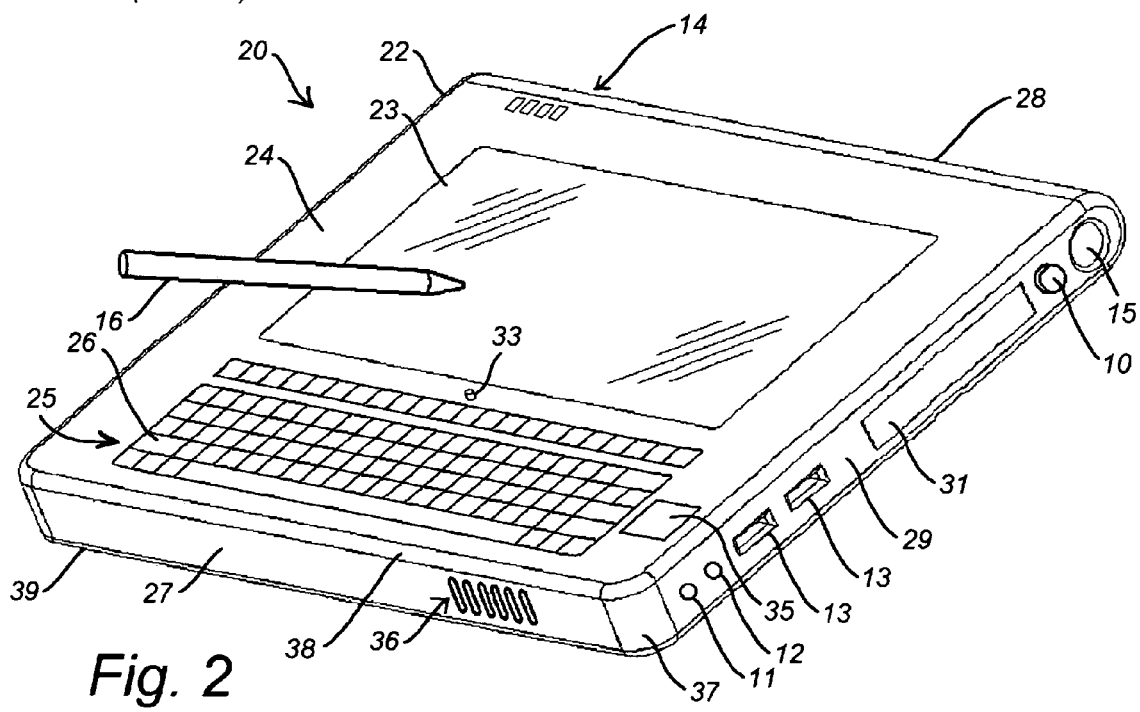
Figure 5:
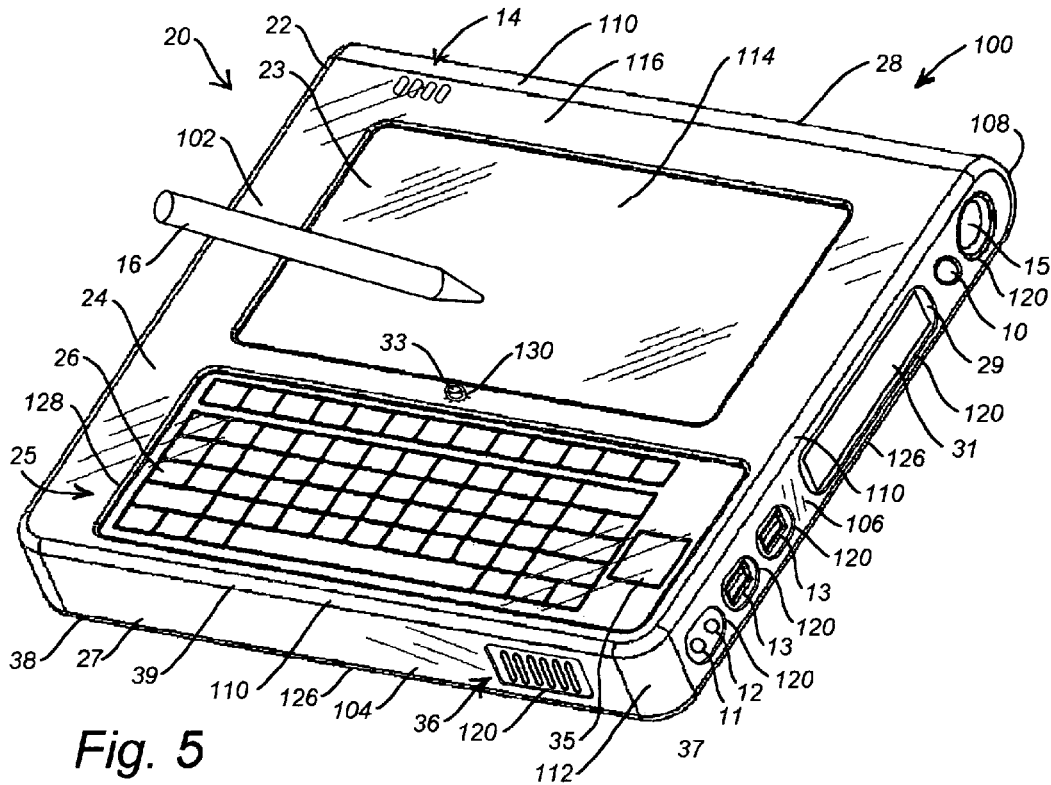
FIG. 5 is a top perspective view that illustrates the integral one-piece optically transparent elastomeric protective cover of the present invention in situ as partially enveloping a portable computer device of the prior art having a pressure or "touch" sensitive screen generally of the type illustrated in FIG. 2.

FIG. 5 illustrates the completely integral one-piece optically transparent elastomeric protective cover 100 of the present invention in situ as partially enveloping the portable computer device 20 generally of the type illustrated in FIG. 2 or another portable electronic device of the prior art having the pressure-sensitive "touch" screen 23. The mask portion 102 of the elastomeric material covers the device's pressure-sensitive touch screen 23 to protect it from scratching, denting, and other external abrasions. Furthermore, the mask portion 102 is sized large enough to cover the keyboard 25 having the traditional array of switch keys 26 as well as any cursor control that may be present, such as but not limited to the toggle switch 33 or touch pad 35 of the types illustrated in FIG. 2. Optionally, the mask 102 includes the relatively thinner window area 114 within the relatively thicker surrounding frame portion 116. The keyboard 25, if present, may be covered by the relatively thicker frame portion 116 of the mask 102. However, the mask portion 102 optionally includes a second window 128 is structured as another thin flexible membrane in a position that corresponds to the device's keyboard 25 and which permits application therethrough to the array of switch keys 26 of pressure exerted by the user for inputting data and operating the computer device in general. Optionally, when present, the relatively thin flexible membrane of second window 128 may be offset from the interior surface of the frame 116 so that the flexible membrane leaves sufficient space for the device's keyboard 25 without exerting its own pressure on the switch keys 26. Optionally, the second window 128 may include individual pockets corresponding to each of the switch keys 26 if desired, such key pockets are also contemplated and may be included without deviating from the scope and intent of the present invention. Additionally, the second window 128 is optionally extended to encompass the cursor control touch pad 35, if present. Alternatively, the cursor control touch pad 35, if present, is accommodated by a third window of the relatively thinner flexible membrane in a corresponding position. Alternatively, the mask portion 102 of the protective cover 100 is structured with a pocket 130 of the elastomeric material positioned for accommodating the cursor control if present as the toggle switch 33. Optionally, the pocket 130 of elastomeric material is relatively thinner than the relatively thicker frame portion 116 of the mask 102 similarly to the window portion 128 for easier manipulation of the toggle switch 33.

The protective cover 100 as illustrated here also includes the integral front, rear and side curtain portions 104, 106 and 108 of elastomeric material that extend seamlessly from the mask portion 102 through upper edge portions 110 to fit over the device's upper edges 39 and extend down across the respective front, rear and side surfaces 27, 28 and 29 of the casing 22 with integral corner portions 112 molded seamlessly therebetween to contour the elastomeric cover 100 to the device casing 20 so that it closely conforms to the device casing 22. One or more of the front, rear and side curtain portions 104, 106 and 108 optionally include an appropriate quantity of the access ports 120 in different positions that correspond to the device's control surfaces and which permit appropriate access. By example and without limitation, one of the access ports 120 may be positioned to correspond to one of the hard wire interface jacks 13; while another of the access ports 120 may be positioned to correspond to the battery charger jack 11 and the audio head-phone output jack 12, and may be sized to permit access to both. Still another of the access ports 120 may be positioned to correspond to the slot 15 or other storage mechanism in the casing 2 for holding the stylus 16. Additionally, by example and without limitation, one or more of the access ports 120 may be positioned to correspond to the drawer-type disc drive 31, if present, or positioned to correspond to the microphone or speaker grille 36 in the front surface 7 of the casing 22, if present.

The protective cover 100 as illustrated here also includes the integral lips 122 of elastomeric cover material that form a mouth opening 124 for receiving the device 20, as illustrated in FIG. 4. The protective cover 100 as illustrated here having the lower edge portions 126 seamlessly joining the integral lips 122 to each of the different front, rear and side curtain portions 104, 106, 108 and the integral corner portions 112 therebetween. The mouth opening 124 is optionally sized to be sufficiently large to expose selected portions of the device 20 therethrough, such as feet 41, critical casing features 43, or other casing features 45 as may be desirable.

As illustrated here, the cover 100 can be removed by peeling back the lips 122 from the device casing 22 to enlarge the mouth opening 124, after which and the device 20 is removed through the enlarged mouth opening 124 by peeling away the remaining mask portion 102 and curtain portions 104, 106, 108 from the device casing 22. The protective cover 100 is either cleaned and reapplied at a later date, or replaced with a new cover 100.

Figure 6:
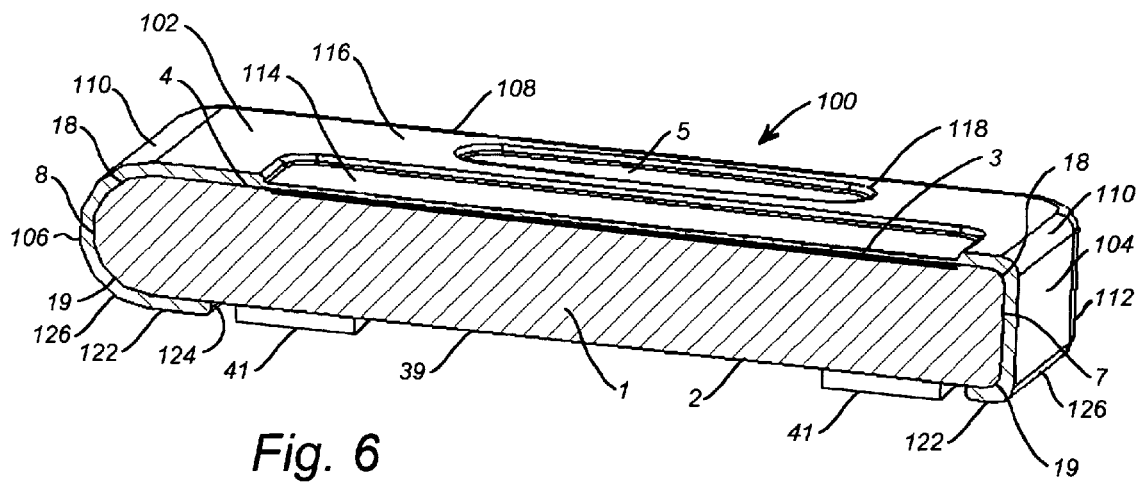
FIG. 6 is a perspective cross-sectional view that illustrates the integral one-piece optically transparent elastomeric protective cover of the present invention in situ as partially enveloping a portable computer device of the prior art having a pressure or "touch" sensitive screen generally of the type illustrated in FIG. 1.

FIG. 6 is a section view taken through the protective cover 100 of the present invention installed over a portable computer device, by example and without limitation, one of the portable computer device 1 or 20 as illustrated herein or another portable computer device having a pressure- or touch-sensitive screen structured for receiving data input therethrough to the device. The portable computer device is illustrated here by example and without limitation as the portable computer device 1 of the type illustrated in FIG. 1. Here, the cover 100 is shown as closely conforming the mask portion 102 to the operating surface 4 of the device's casing 2 with the window portion 114 closely conformed to the touch screen 3, while the different front, rear and side curtain portions 104, 106, 108 closely conform to respective front, rear and side casing surfaces 7, 8 and 9. Additionally, the integral lips 122 wrap around the casing lower edges 18 and extend onto the casing's bottom surface 39 with the mouth opening 124 sized to expose the feet 41, critical casing features 43, or other casing features 45 as may be present. Thus, the device 1 is protected from bumps and scrapes and from virtually all spills of liquid draining over the device casing 2.

Figure 7:
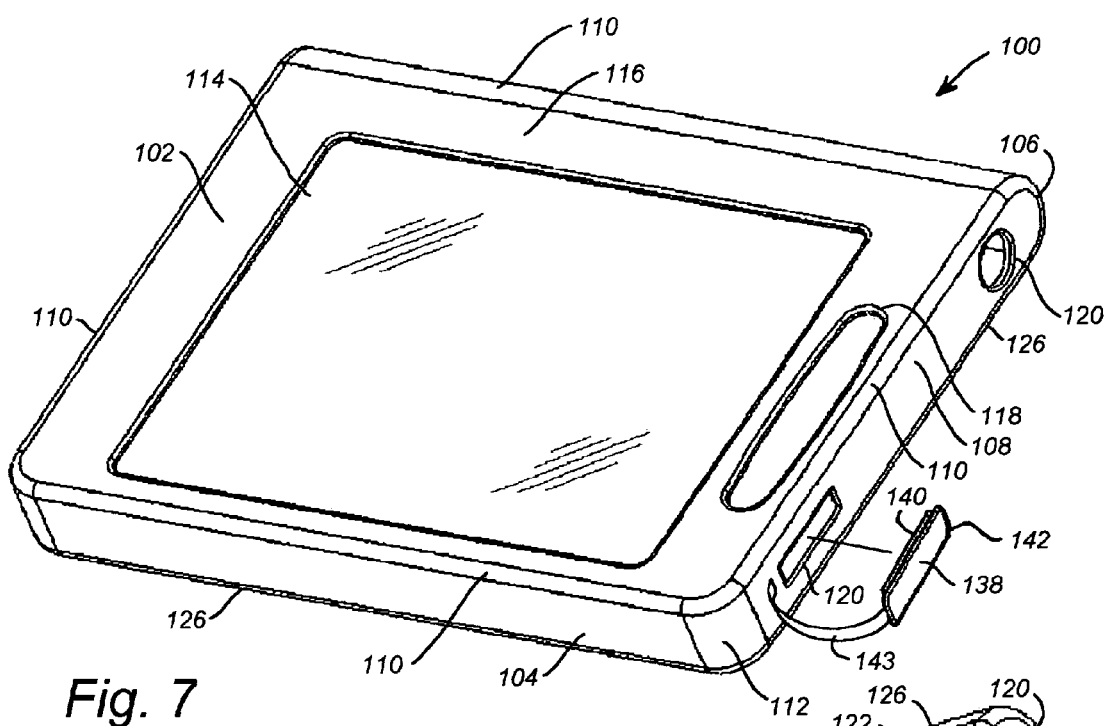
FIG. 7 is a top perspective view that illustrates the integral one-piece optically transparent elastomeric protective cover of the present invention having an access port in one side and shown with an optional sealing lid.

FIG. 7 illustrates the protective cover 100 of the present invention as discussed herein standing alone without the device 1 installed. As illustrated here, one or more of the access ports 120 in the front, rear and side curtains 104, 106, 108 have optional sealing lids 138 that are structured for substantially sealing a corresponding access port 120. By example and without limitation, the sealing lids 138 may take the form of plugs that, as illustrated here by example and without limitation, each include a stem portion 140 structured to mate with the corresponding access port 120, and a larger cap portion 142 that covers the curtain portion 104, 106 or 108 of the cover 100 surrounding the access port 120. Accordingly, the plug lids 138 provide protection against spills of liquid by substantially covering the corresponding control surface, such as the battery charger and/or a audio head-phone output jacks 11, 12, and/or hard wire interface jacks 13. The plug lids 138 may be molded separately from the cover 100. The plug lids 138 may be tied to the cover, for example, by a strap 143 that may be molded integrally with the cover and corresponding plug lid 138.

Figure 8:
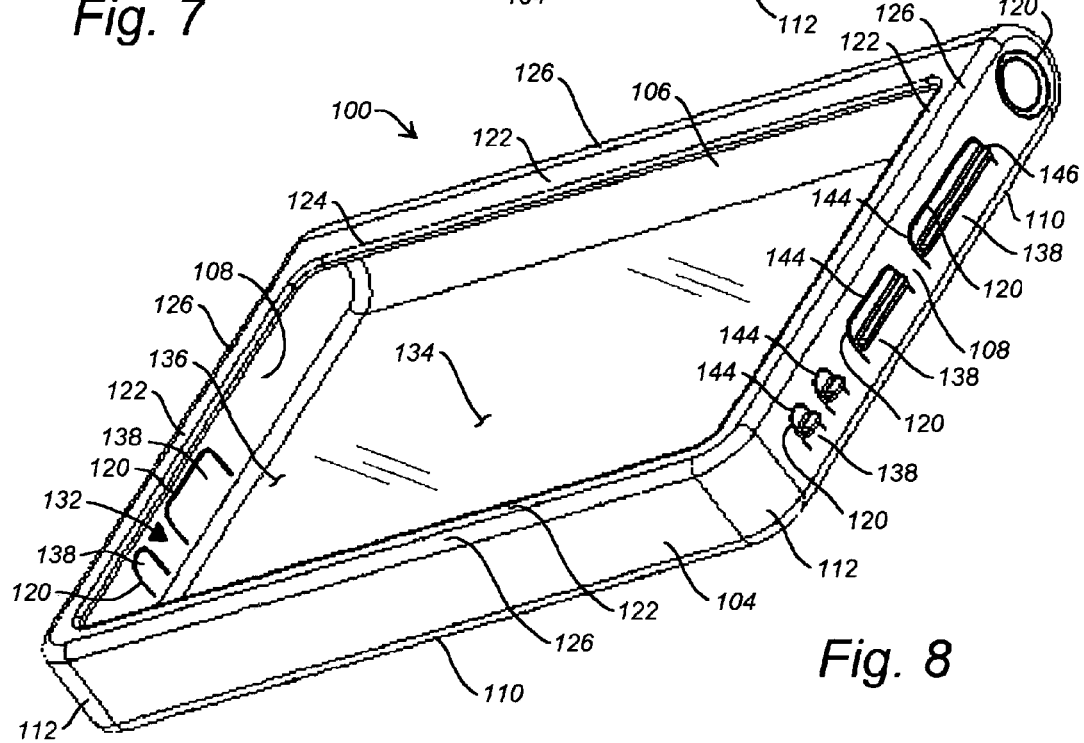
FIG. 8 is a bottom perspective view that illustrates an interior cavity of the protective cover of the invention.

FIG. 8 is a bottom view that illustrates the protective cover 100 that shows an interior cavity 132 accessible through the mouth opening 124, the interior cavity 132 being sized to accept and closely conform to the casing 2 of the portable computer device 1. As illustrated here, an inside surface 134 of the window portion 114 of the mask portion 102 may be substantially coplanar with an inside surface 136 of the frame portion 116 so that the thin membrane of the window portion 114 is positioned as close as possible to direct contact with the device touch screen 3. Similarly, if present, the second window 128 of the mask portion 102 may be substantially coplanar with the inside surface 136 of the frame portion 116 so that the thin membrane is positioned as close as possible to direct contact with the keys 26 of the device's keyboard 25 and the cursor control touch pad 35, if present.

As illustrated here, one or more of the access ports 120 in the front, rear and side curtains 104, 106, 108 have the optional sealing lids 138 that here, by example and without limitation, may take the form of flap lids. By example and without limitation, as illustrated here, the flap lids 138 are molded in place as extensions of the respective front, rear or side curtains 104, 106, 108, which hinge the flap lid 138 thereabout. Each flap lid 138 includes a flap 144 sized to substantially fill the corresponding access port 120, whereby the flap lid 138 protects against spills of liquid by substantially covering the corresponding control surface, such as the battery charger and/or a audio head-phone output jacks 11, 12, and/or hard wire interface jacks 13. One or more of the flap lids 138 optionally includes a handle 146 formed on the flap 144 and structured, by example and without limitation, as an extension protruding from the face of the flap 144. However, one or more of the access ports 120 is optionally left open without a sealing lid 138. For example, the access port 120 provided in the side curtain 108 for accessing the stylus storage chamber 15 is optionally left open so that easy access is not impeded.

Figure 9:
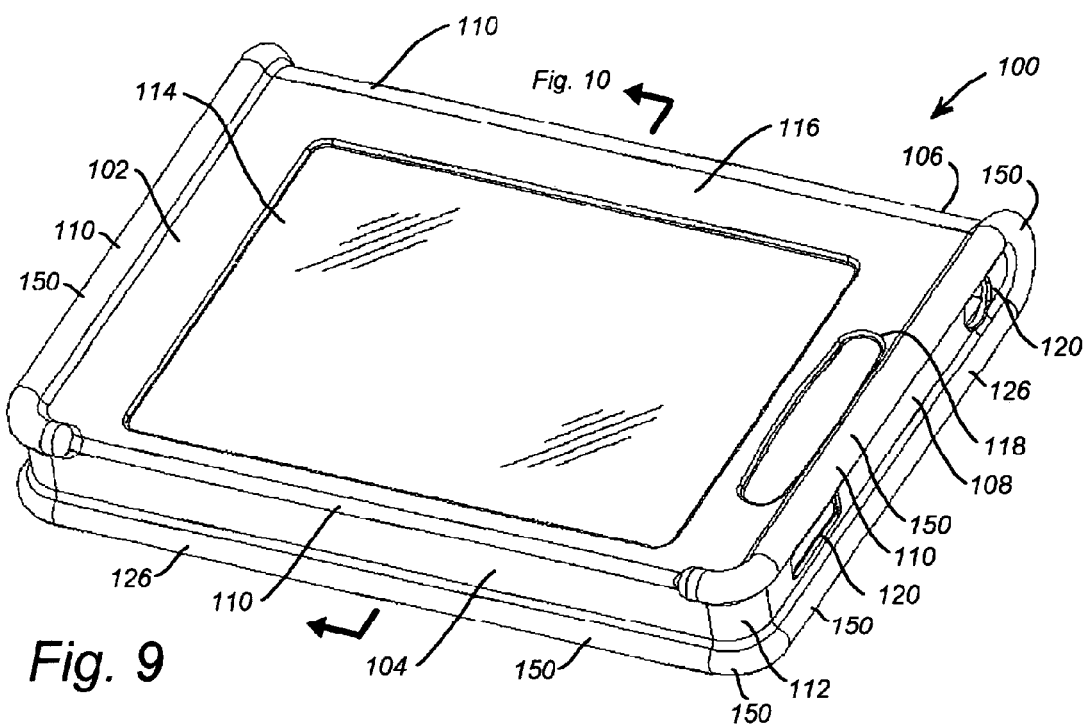
FIG. 9 is a top perspective view that illustrates the integral one-piece optically transparent elastomeric protective cover of the present invention having piping along different edge surfaces thereof.

FIG. 9 illustrates the completely integral one-piece optically transparent elastomeric protective cover 100 of the invention having integrally molded thickened beads or "piping" 150 along one or more of the upper and lower edges 110, 126 and around the corners 112. The piping 150 protects the device 1 from damage from dropping because impact typically occurs at corners 17 and along upper and lower edges 18, 19 of the casing 2. The piping 150 may be interrupted, by example and without limitation, along upper edge 110 of the front curtain 104 to avoid interfering with the user's operation of the device 1.

Figure 10:
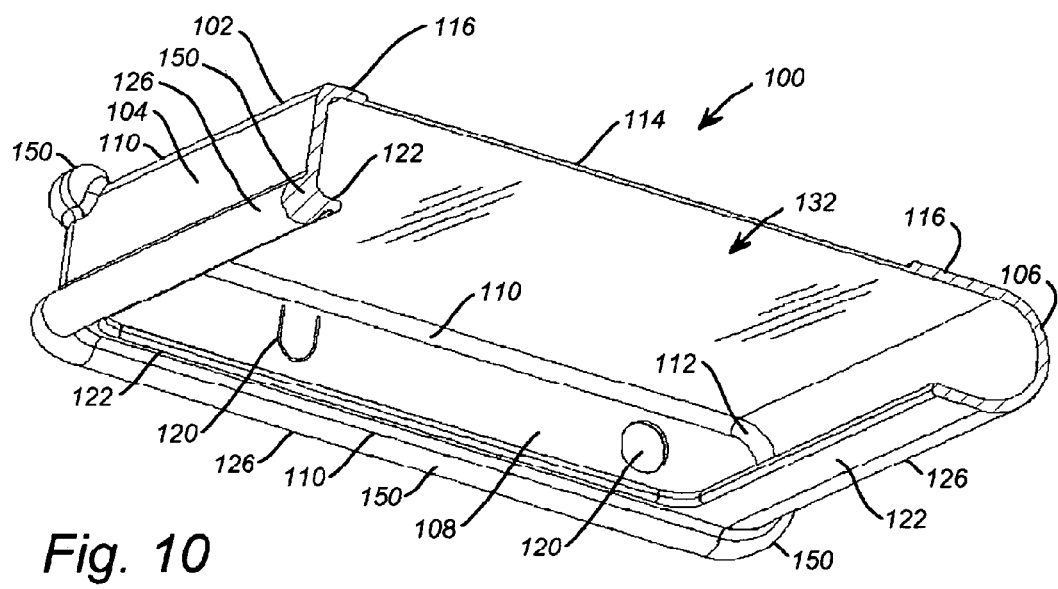
FIG. 10 is a perspective cross-sectional view that illustrates the integral one-piece optically transparent elastomeric protective cover of the present invention having piping along different edge surfaces thereof.

FIG. 10 is a section view of the protective cover 100 of the invention having integrally molded thick beads or "piping" 150 along one or more of the upper and lower edges 110, 126 and around the corners 112. This Figure also more clearly illustrates the inside surface 134 of the window portion 114 of the mask portion 102 being substantially coplanar with the inside surface 136 of the frame portion 116 so that the thin membrane of the window portion 114 is positioned as close as possible to direct contact with the device touch screen 3. This Figure also illustrates that surfaces of the edges 110, 126 and the corners 112 inside the cavity 132 are contoured to match contours of the device casing 2.

Figure 11:
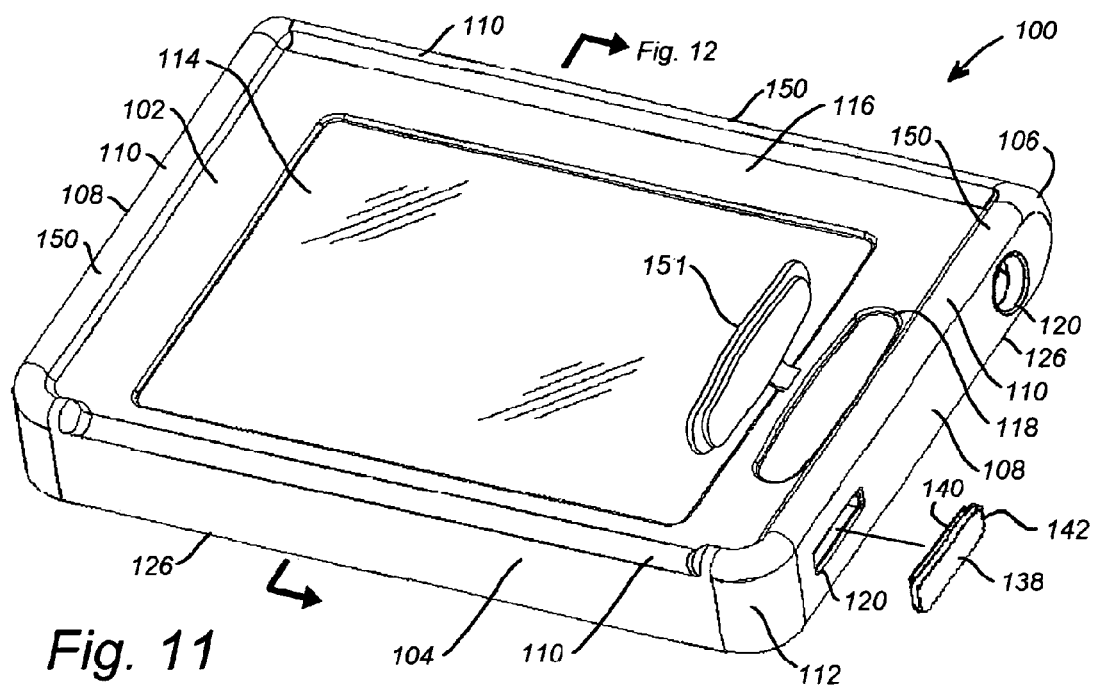
FIG. 11 is a top perspective view that illustrates the integral one-piece optically transparent elastomeric protective cover of the present invention having thickened side walls.

FIG. 11 illustrates the completely integral one-piece optically transparent elastomeric protective cover 100 of the invention having the front, rear and side curtain portions 104, 106 and 108 integrally molded as thick walls of the elastomeric material that are seamlessly extended from the mask portion 102 through upper edge portions 110. The interior cavity 132 of the protective cover 100 is contoured to closely conform to the device casing 2, and the thick curtain walls 104, 106, 108 further protect the device 1 from impacts to the casing 2. Optionally, one or more of the thick curtain walls 104, 106 and 108 extend above the surface of the mask portion 102 in the beads or "piping" 150 along one or more of the upper and lower edges 110, 126 and around the corners 112. The piping 150 provides yet more protection against damage from dropping because impact typically occurs at corners 17 and along upper and lower edges 18, 19 of the casing 2. The piping 150 again may be interrupted, by example and without limitation, along upper edge 110 of the front curtain 104 to avoid interfering with the user's operation of the device 1.

As also illustrated here, when the access port 118, if present, is provided as an opening formed through the thicker elastomeric material of the frame portion 116 of the mask portion 102, an optional sealing lid 151 may be provided for substantially sealing the opening. By example and without limitation, the sealing lid 151 is one of the types of sealing lids 138 described herein or another suitable sealing lid capable of sealing the open access port 118.

Figure 12:
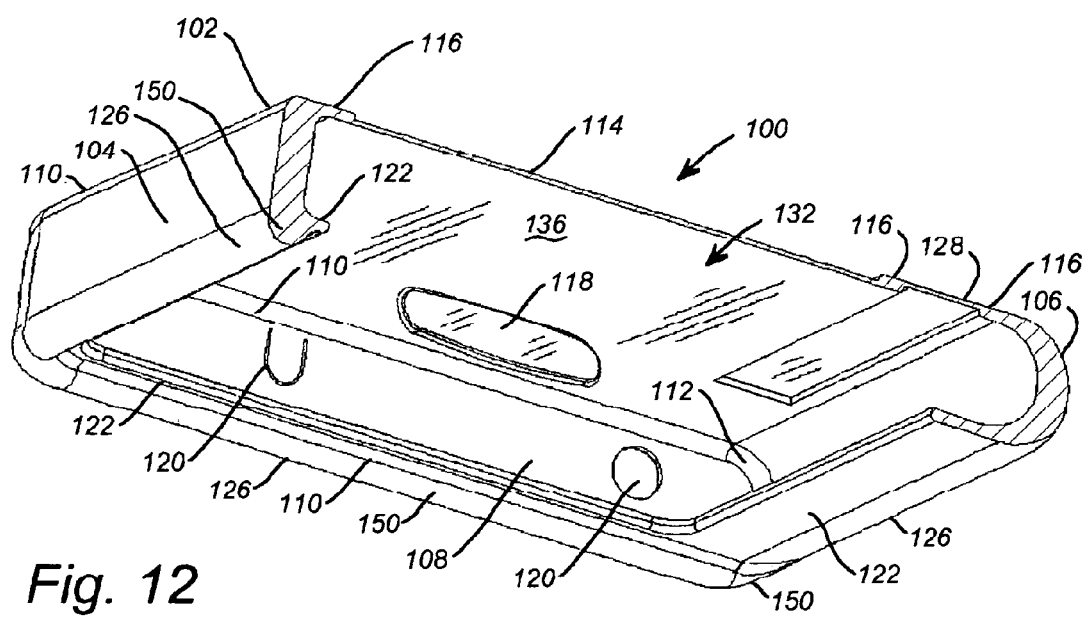
FIG. 12 is a perspective cross-sectional view that illustrates the integral one-piece optically transparent elastomeric protective cover of the present invention having thickened side walls.

FIG. 12 is a section view of the protective cover 100 of the invention having integrally molded thick front, rear and side curtain portions 104, 106 and 108 with the thick beads or "piping" 150 extended above the surface of the mask portion 102 along one or more of the upper and lower edges 110, 126 and around the corners 112. As illustrated here, the surfaces of the edges 110, 126 and the corners 112 inside the cavity 132 are contoured to match contours of the device casing 2.

As also illustrated here is the access portion 118 of the mask portion 102 being configured as another window area structured as a relatively thin flexible membrane portion of the frame 116, similar to the window area 114, whereby the switch keys 6 are easily manipulated through the relatively thin flexible membrane, while the membrane effectively protects the device 1 from spills of liquid by covering the key pad 5.

Here, by example and without limitation, the relatively thin flexible membrane of the window area-type access portion 118 is offset from the interior surface 136 of the frame portion 116 of the frame 116 so that the flexible membrane leaves sufficient space for the device's key pad 5 without exerting its own pressure on the switch keys 6.

Also illustrated here by example and without limitation is the relatively thin flexible membrane of the second window 128 is offset from the interior surface 136 of the frame portion 116 of the frame 116 so that the flexible membrane leaves sufficient space for the device's keyboard 25 without exerting its own pressure on the array of switch keys 26.

Figure 13:
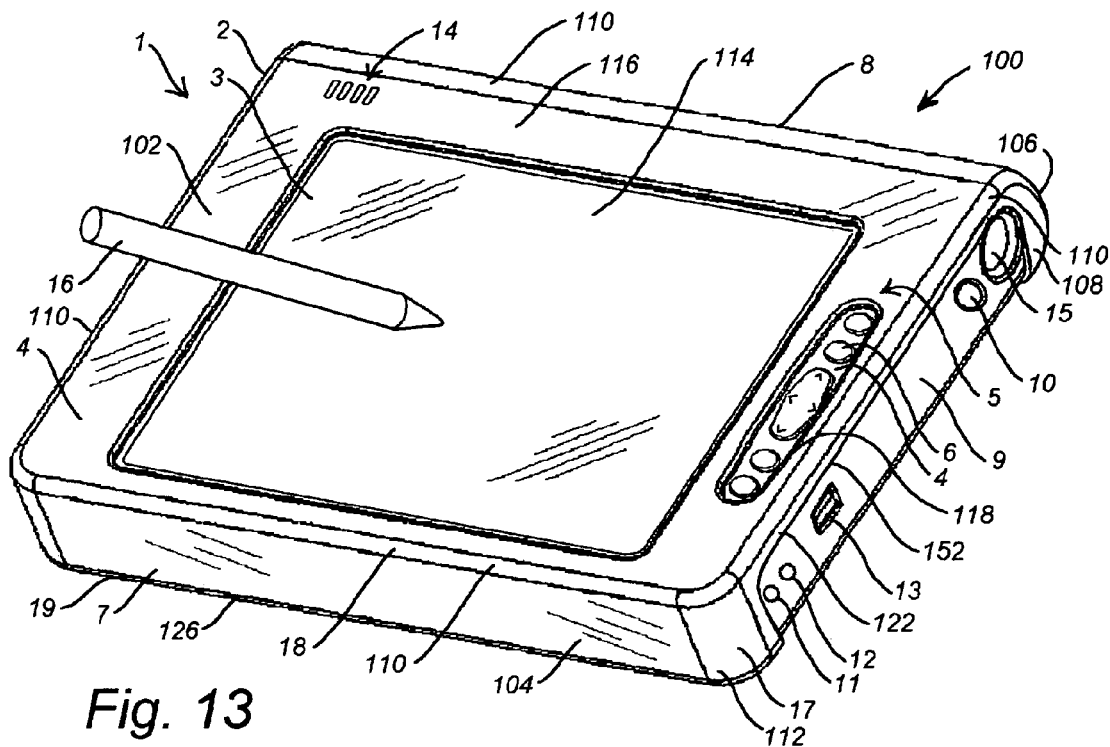
FIG. 13 is a top perspective view that illustrates the integral one-piece optically transparent elastomeric protective cover of the present invention having an access port formed as a cutout in one side thereof.
Figure 14:
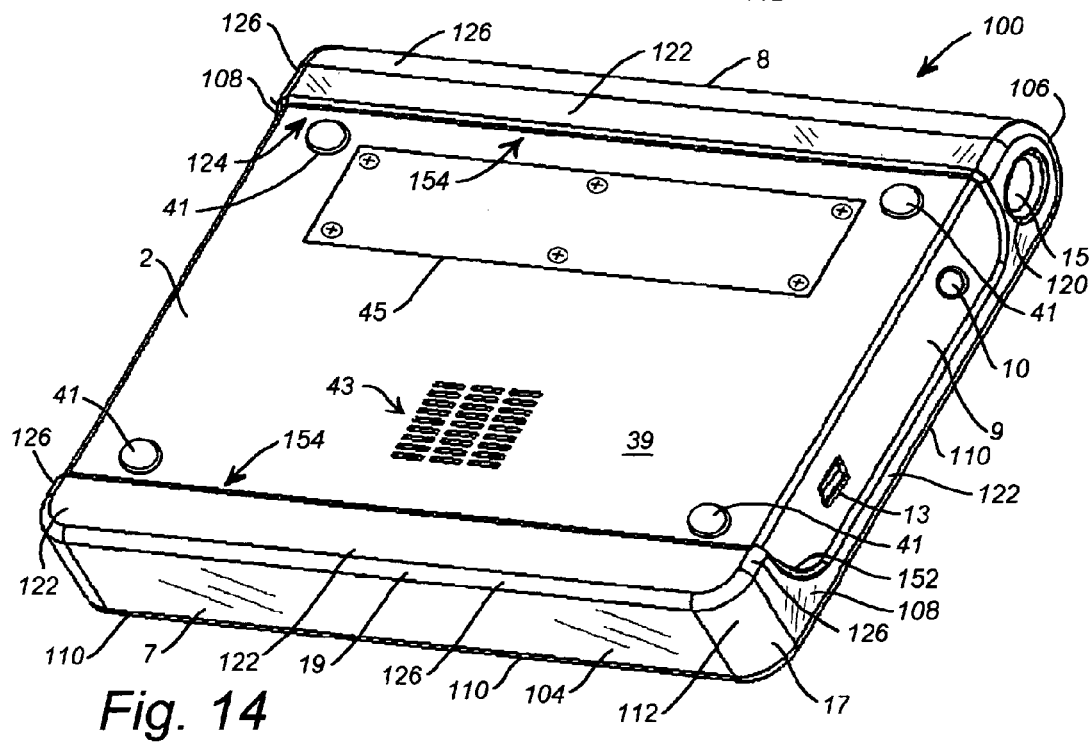
FIG. 14 is a bottom perspective view that illustrates the integral one-piece optically transparent elastomeric protective cover of the present invention having an access port formed as a cutout in one side thereof

FIGS. 13 and 14 are top and bottom views, respectively, that illustrate the protective cover 100 of the invention wherein the lip portions 122 on opposite sides are drawn back toward the mask portion 102 such that one or both of the access ports 120 is alternatively formed as a cutout 152 in the corresponding side curtain 108. The cutout 152 is sized to clear the control surfaces that may be present in the side surfaces 9 of the device casing 2, such as the power ON-OFF key 10, battery charger jack 11, and/or audio head-phone output jack 12, or the hard wire interface jacks 13. Additionally, one or more of the aperture type access ports 120 may be retained, for example, as access for the stylus slot 15, as illustrated in FIG. 14. When the cutout 152 substituted for the aperture-type access port 120, the cavity 124 into which the device 1 is fit is provided by a pair of pockets 154 in opposite ends of the cover 100.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A protective cover for a device having a touch-sensitive screen, the cover comprising:
    a protective cover formed of a substantially continuous flexible material, the protective cover comprising a mask portion substantially surrounded with a plurality of interconnected curtain portions extending therefrom and forming therebetween a plurality of interconnected lip portions, the mask, curtain and lip portions forming a cavity therebetween with the lip portions surrounding a mouth opening thereinto;
    the mask portion further comprising a relatively thicker frame portion surrounding a relatively thinner recessed integral window portion formed of a substantially optically transparent flexible membrane; and wherein the substantially continuous flexible material further comprises a substantially optically transparent material; and the cover further comprises a unitary combination of the mask, curtain and lip portions with the curtain portions being contiguous with the mask portions, and different curtain portions being contiguous with corresponding ones of the lip portions.

2. The cover of claim 1 wherein the window and frame portions of the mask each further comprises a surface that is interior of the cavity, the interior surface of the window portion being substantially coplanar with the interior surface of the frame portion.

3. The cover of claim 2, further comprising a second integral window portion formed of a second flexible membrane having an interior surface that is offset from the interior surface of the frame portion.

4. The cover of claim 1 wherein the mask portion further comprises an access port formed therethrough.

5. The cover of claim 1 wherein one or more of the curtain portions further comprises an access port formed therethrough.

6. The cover of claim 5 wherein one or more of the curtain portions further comprises a sealing lid structured for substantially sealing the access port formed therethrough.

7. The cover of claim 1 wherein the cover further comprises an edge portion between the mask portion and one or more of the curtain portions, and piping extended along one or more of the edge portions.

8. The cover of claim 1 wherein:
    the curtain portions further comprise front, rear and a pair of side curtain portions with the front and rear curtain portions being positioned on opposing ends of the pair of side curtain portions positioned between;
    the lip portions extending from one or more of the side curtain portions are further structured to form a cutout within the corresponding side curtain portion; and
    the cavity formed between the mask, side curtain and lip portions further comprises a pair of opposing pockets positioned at opposite ends of the cutout.

9. A protective cover for a device having a touch-sensitive screen, the cover comprising:
    a substantially continuous sheet of substantially flexible elastomer material comprising a unitary cover having a mask portion surrounded by integral front, rear and side curtains formed substantially continuous with the mask portion and joined together by integral corner portions formed substantially continuous with the curtains, and a continuous integral lip portion formed substantially continuous with the curtains and extending inward thereof and forming a mouth opening therebetween;

a cavity formed by the mask, curtain and lip portions with the mouth opening being substantially opposite from the mask portion;

a viewing and operating window panel formed of a substantially continuous and relatively thin and substantially optically transparent flexible membrane in a portion of the mask that is exterior of the cavity and surrounded by a relatively thick flexible frame portion of the mask and substantially continuous with the frame portion, a substantially planar smooth exterior surface of the window panel that is exterior of the cavity being recessed relative to the frame portion, and a substantially planar smooth interior surface of the window panel that is interior of the cavity being substantially coplanar with the frame portion; and an access hole formed through the frame portion of the mask adjacent to the window panel.

10. The cover of claim 9 wherein the sheet of elastomer further comprises a substantially optically transparent elastomer.

11. The cover of claim 10 wherein the front and rear curtains are contiguous with opposite front and rear ends of the masks; the side curtains are contiguous with opposite sides of the mask portions; the front, rear and side curtains are contiguous with the corner portions therebetween; and the continuous lip portion is contiguous with the front, rear and side curtains.

12. The cover of claim 11 wherein the cavity further comprises a pair of pockets, a first one of the pair of pockets being formed between the mask portion in combination with the front curtain and first portions of the pair of side curtains adjacent thereto, and a second one of the pair of pockets being formed between the mask portion in combination with the rear curtain and second portions of the pair of side curtains adjacent thereto.

13. The cover of claim 11 wherein one or more of the pair of side curtains further comprises an access port formed therethrough.

14. The cover of claim 13, further comprising a sealing lid structured for substantially sealing the access port.

15. The cover of claim 11, further comprising a first edge portion formed between the mask portion and one or more of the front, rear and side curtains, and piping extended along one or more of the edge portions.

16. The cover of claim 15 wherein the piping is extended along the first edge portion formed between the mask portion each of one or more side curtains; and further comprising a second edge portion formed between the lip portions and a corresponding one of the side curtains;

the piping is extended along the second edge portion formed between the lip portions and a corresponding one of the side curtains; and a quantity of the elastomer extended between the piping along the first edge portion formed between the mask portion and each of one or more side curtains and the piping along the second edge portion formed between the lip portion and the side curtain.

17. A method of protecting a device having a touch-sensitive screen by using a protective unitary cover formed in a sheet of substantially optically transparent flexible elastomer and having a mask portion surrounded by integral front, rear and side curtain portions joined together by integral corner portions, and a continuous integral lip portion extending inward of the curtain portions and forming a cavity therebetween having a mouth opening positioned opposite from the mask portion, and forming in a portion of the mask that is exterior of the cavity the mask portion a relatively thin and substantially optically transparent flexible membrane surrounded by a relatively thick flexible frame portion with the flexible membrane being formed having substantially planar smooth interior and exterior surfaces and the exterior surface being recessed relative to an exterior surface of the frame portion while the interior surface is substantially coplanar with an interior surface of the frame portion, the method comprising:

fitting one end of the device having a touch-sensitive screen through the mouth opening into the cavity formed by a substantially optically transparent flexible elastomer protective cover;

stretching the mouth opening sufficiently to receive a remainder of the device;

receiving the remainder of the device through the mouth opening into the cavity;

positioning a substantial entirety of the touch-sensitive screen into contact with the interior surface of the flexible membrane portion of the protective cover; and relaxing the mouth opening about the device.

18. The method of claim 17, further comprising positioning a control surface of the device substantially in alignment with an access port formed through one of the mask portion and the front, rear and side curtain portions.

19. The method of claim 18, further comprising substantially sealing the access port against liquid penetration.

* * * * *